United States Patent [19]

Slaney et al.

[11] Patent Number: 5,684,912
[45] Date of Patent: Nov. 4, 1997

[54] OPTICAL FIBER SIGNAL ATTENUATOR

[75] Inventors: Paul J. Slaney, Groton; Daniel Hayes, Chelmsford, both of Mass.

[73] Assignee: Fico, Inc., Tyngsboro, Mass.

[21] Appl. No.: 544,612

[22] Filed: Oct. 18, 1995

[51] Int. Cl.[6] ................................................ G02B 6/00
[52] U.S. Cl. ................................ 385/140; 385/147
[58] Field of Search .......................... 385/61, 63, 66, 385/67, 140, 32, 147

[56] References Cited

U.S. PATENT DOCUMENTS

| | | | |
|---|---|---|---|
| 4,697,869 | 10/1987 | So et al. | 350/96.15 |
| 4,721,351 | 1/1988 | Geopfert et al. | 385/140 X |
| 4,808,204 | 2/1989 | Wright | 65/1 |
| 4,822,125 | 4/1989 | Beals et al. | 385/140 X |
| 4,996,420 | 2/1991 | Redford | 250/227.24 |
| 5,039,188 | 8/1991 | Williams | 385/32 |
| 5,311,614 | 5/1994 | Caron et al. | 385/140 |
| 5,319,734 | 6/1994 | Buzzetti | 385/140 |

OTHER PUBLICATIONS

Scholl et al., "In-line fiber optical attenuator and powermeter," *SPIE*, vol. 1792, Components for Fiber Optic Applications, VII, pp. 65–70, 1992.

Reedy et al., "Three new fiber–optic components," *SPIE*, vol. 574, Fiber Optic Couplers, Connectors, and Splice Technology, II, pp. 24–28, 1985.

Fico, Inc., "New Product—SGA–100 Singlemode Attenuator," National Fiber Optic Engineers Conference, Boston, MA, Jun. 18–22, 1995.

Fico, Inc., "New Product–Emergency Restoration Safety Clamp," National Fiber Optic Engineers Conference, Boston, MA, Jun. 18–22, 1995.

*Primary Examiner*—Akm E. Ullah
*Attorney, Agent, or Firm*—Theresa A. Lober

[57] ABSTRACT

The invention provides a scheme for attenuating light transmitted through an optical fiber, using an attenuator including a base plate having a series of vertical protrusions extending therefrom and a top plate positioned to close with the base plate. When closed, the base plate and top plate clamp a length of optical fiber between the base plate vertical protrusions and the top plate such that an optical fiber bends around the protrusions. Also provided is an optical attenuator including a rigid base plate having a channeled depression, on one face of the base plate, that includes a nonlinear channel path along at least a portion of the channeled depression. The channeled depression extends from a first point at an edge of the base plate face to a second point at an edge of the base plate face to form a continuous channel path between the first and second edge points. A length of optical fiber can be positioned in the channel path such that bends in the nonlinear channel path producing corresponding bends in the length of optical fiber.

25 Claims, 6 Drawing Sheets

OPTICAL FIBER SIGNAL ATTENUATOR

FIELD OF THE INVENTION

This invention relates to systems for optical signal transmission through optical fibers, and more particularly relates to techniques for attenuation of transmission signal power in optical fibers.

BACKGROUND OF THE INVENTION

Optical fiber is now widely employed as a signal carrier for telecommunications transmission. In this scheme, a laser is employed as the source generator for signals carried by the fiber. Typically, an optical fiber transmission network consists of many tap points along a fiber length at which the transmitted signal is tapped, or two or more branches through which the laser signal is transmitted in parallel from the laser source. To ensure that adequate signal power is provided for such multi-tap or parallel networks, the laser source employed for these networks is typically selected to produce a high-power signal.

Frequently it is desirable to attenuate the signal power being carried in an optical fiber transmission network to produce a lower level of signal power at particular sections of the network. For example, it is often the case that the optical signal receiver in a branch or at a signal tap of a fiber network cannot accommodate the power level of the signal being transmitted to it without causing a fault condition at the receiver or other processing electronics. Historically, this condition has been accommodated by cutting the optical fiber and inserting in the fiber length an optical power attenuator device for attenuating the optical signal power before it reaches a location at which a lower power signal is required. Such an optical power attenuator has conventionally been based on the phenomenon whereby bending of an optical fiber causes attenuation of the signal power carried by the fiber to a degree directly corresponding to the amount of the fiber bend. At the bend location, and for a given angle of bending beyond that required to maintain an optical signal within the low-loss central fiber section, called the fiber core, a fraction of the fiber's optical signal power is directed out of the fiber core, and is lost in the lossy fiber cladding that surrounds the core. A smaller-radius fiber bend thereby results in a larger attenuation factor.

Scholl et al. describe such an attenuation device in "In-Line Fiber Optical Attenuator and Powermeter," *SPIE, Vol.* 1792, pp. 65–70, 1992. Here a so-called attenuation coil and accompanying control system is inserted along the length of an optical fiber for which power attenuation is desired. The fiber is first cut and then each end of the cut is connected to an input or output coupler of the system's attenuation coil. The attenuation coil is configured as a loop of fiber held between two plates such that the plates can be moved together to produce a degree of bending of the coil corresponding to a desired attenuation level. Optical power exiting the system output coupler is decreased below that which entered the system based on the selected degree of attenuation coil bending. So et al., U.S. Pat. No. 4,697,869, also show an optical attenuator that is inserted at a splice point along a length of fiber. Here, each end of a cut in a fiber is connected to an input or output coupler of an attenuator shaped as a tapered spool and around which is wound an attenuator fiber. Adjustment of the attenuator fiber at lateral points along the spool adjusts the degree of attenuator fiber bending and produces a corresponding degree of signal attenuation at the output of the attenuator.

In an effort to reduce the complexity of optical power attenuator systems like these, others have proposed attenuator devices that do not require cutting of a fiber in which signal power is to be attenuated. For example, Caron et al., U.S. Pat. No. 5,311,614, and Buzzetti, U.S. Pat. No. 5,319, 734, have shown optical attenuator devices in which an optical fiber may be input, via connectors or an input aperture, to a housing including a deformable spring structure which supports a length of the fiber positioned around the spring periphery. A plunger or set screw is located at a point along the spring for pushing the fiber at that point to deform the fiber against the spring and achieve a desired corresponding level of attenuation.

Although such attenuator devices do provide workable schemes for attenuation of optical power, they present impractical complexities in their mechanisms for "tuning in" a desired level of power attenuation. Due to the number of moving mechanical pieces and their need for precise alignment, manual calibration of the devices is required to ensure that a desired attenuation is in fact provided. As a result, use of these attenuation devices can require an impractically-long installation time. Indeed, in instances in which optical power must be quickly attenuated to alleviate a fault condition, such devices may prove to be unacceptable.

More importantly, however, manual handling of an optical fiber for attenuator installation, calibration, or other purposes can pose safety risks. This is particularly true for situations in which an optical fiber that is transmitting high-power laser signals must be manipulated at the same time it is transmitting signals; such a situation may occur, e.g., when a fiber breaks unexpectedly and requires repair. Here it is not practical to extensively manually handle the ends of the fiber at the point of the break because of the risk of acute eye injury should the fiber be inadvertently pointed at a repair person's face. Even at lower signal powers, eye damage may be caused after extended exposure to the signal.

As a result, it is generally required that all laser source transmission equipment be shut down to inactivate a fiber length before a break in the fiber can be repaired. In fact, typical fiber attenuator designs for splicing into a length of fiber are based on an assumption that the length of fiber in which the attenuator is to be spliced is inactive at the time the fiber is cut. And conventional in-line attenuator devices that do not require fiber cutting are not applicable to this condition of a broken fiber. Yet it is sometimes impossible to shut down all laser transmission equipment in an optical fiber network and furthermore, the time required to travel to various transmission points is often prohibitively long. In addition, once transmission equipment is shut down, there remains a risk of it being inadvertently activated while manual handling of the fiber takes place.

Conventional optical attenuator schemes do not meet the timing and safety requirements posed by repair work on unanticipated breaks in fiber that is actively transmitting high-power signals. The precise mechanical alignment and calibration requirements of typical attenuator devices further pose difficulties in installation even for attenuation in an unbroken length of fiber. Thus, although a wide range of optical fiber attenuation schemes and devices have been proposed, they have heretofore provided only suboptimal optical attenuation techniques.

SUMMARY OF THE INVENTION

The present invention overcomes the limitations of conventional optical attenuators to provide attenuation of optical fiber signals by way of techniques that can be accomplished quickly and with a minimum of manual handling.

Accordingly, in a first aspect, the invention provides a scheme for attenuating light transmitted through an optical fiber using an attenuator including a base plate having a series of vertical protrusions extending therefrom and a top plate positioned to close with the base plate. When closed, the base plate and top plate clamp a length of optical fiber between the base plate vertical protrusions and the top plate such that an optical fiber bends around the protrusions.

When bent around the protrusions, a portion of the light transmitted through the optical fiber escapes from the fiber core into the fiber cladding, where it is quickly absorbed. As a result, the power of the light remaining in the optical fiber at points after the bend is lower than the power of light in the fiber before the bend. This attenuator can be installed very quickly on an optical fiber that is actively transmitting signals and with a minimum of manipulation; as a result, the risk of injury due to exposure to the optical signal power is minimized. Furthermore, the attenuator requires no alignment of mechanical components or calibration, and thus provides reproducible and reliable attenuation levels.

In a second aspect, the invention provides an optical attenuator including a top plate having a base plate and a top plate having a series of vertical protrusions extending therefrom. The top plate is positioned to close with the base plate. When closed, the base plate and top plate clamp a length of optical fiber between the top plate vertical protrusions and the base plate such that an optical fiber bends around the protrusions.

In preferred embodiments, both the top plate and the base plate have a series of vertical protrusions; preferably, the top plate protrusions are positioned to intermesh with the protrusions of the base plate. The protrusions are preferably rounded.

In other preferred embodiments, the base plate includes a first fiber holder positioned at one edge of the base plate to secure an optical fiber at that edge, and preferably, the base plate includes a second fiber holder positioned at a second edge of the base plate to vertically secure an optical fiber at that second edge. Additionally, the base plate further preferably includes a fiber ribbon cable holder positioned at one edge of the base plate to secure an optical fiber ribbon cable at that edge, and most preferably includes a second fiber ribbon cable holder positioned at a second edge of the base plate to secure an optical fiber ribbon cable at that second edge.

In other preferred embodiments, a hinge is attached to one end of the base plate and a corresponding end of the top plate to rotatably connect the base plate to the top plate. Preferably, a securing device is located on the base plate and a corresponding securing device is located on the top plate in a position to engage the securing device on the base plate when the top plate is lowered to close with the base plate.

In another aspect, the invention provides an optical attenuator including a rigid base plate having a channeled depression, on one face of the base plate, that includes a nonlinear channel path along at least a portion of the channeled depression. The channeled depression extends from a first point at an edge of the base plate face to a second point at an edge of the base plate face to form a continuous channel path between the first and second edge points. A length of optical fiber can be positioned in the channel path such that bends in the nonlinear channel path produce corresponding bends in the length of optical fiber.

In preferred embodiments, the channeled depression is of a depth sufficient to support a length of optical fiber such that the optical fiber does not protrude from the face of the base plate. Preferably, the channeled depression includes a straight channel path section connected to the nonlinear channel path between the first and second base plate edge points.

In preferred embodiments, the nonlinear channel path is a circular path, a sinusoidal path, an elliptical path, or a path around at least two circles, in which case the circles are can be of differing radii.

In another aspect, the invention provides a method for repairing a break in a length of optical fiber at the same time that light may be transmitted through the fiber. In the inventive method, the fiber is clamped, at a point along the fiber on one side of the break, between top and bottom plates of an attenuator clamp. The attenuator clamp has rounded protrusions and bends the fiber around the protrusions to attenuate power of the any light that may be transmitted through the fiber on that one side of the break. After the fiber is clamped, the break in the fiber is repaired.

Preferably, after the break in the fiber is repaired, the attenuator clamp is then removed. In preferred embodiments, the attenuator clamp has protrusions on the top plate and protrusions on the bottom plate that intermesh with the protrusions on the top plate. In other preferred embodiments, a second attenuator clamp, having rounded protrusions, is clamped on the fiber on a second side of the break to attenuate power of any light that may be transmitted through the fiber on that second side of the break before repairing the break in the fiber.

In another aspect, the invention provides a method for attenuating light transmitted through a length of optical fiber. The fiber is clamped at a point along its length between top and bottom plates of an attenuator clamp, having rounded protrusions, that bends the fiber around the protrusions.

In another aspect, the invention provides a method for attenuating light transmitted through a length of optical fiber, by positioning a section of the fiber length in a channeled depression of a channel attenuator base plate. The base plate has a nonlinear channel path along at least a portion of the channeled depression and forms a continuous path between two outside points of the base plate. The depression bends the fiber section along the nonlinear channel path.

In another aspect, the invention provides a method for handling an optical fiber at the same time that light may be transmitted through the fiber. In the inventive method, the fiber is clamped, at a point along the fiber on one side of a fiber section to be handled, between top and bottom plates of an attenuator clamp. The attenuator clamp has rounded protrusions and bends the fiber around the protrusions to attenuate power of the any light that may be transmitted through the fiber on that one side of the break. After the fiber is clamped, the section of fiber can be handled.

Preferably, after the section of fiber is handled, the attenuator clamp is then removed In preferred embodiments, the attenuator clamp has protrusions on the top plate and protrusions on the bottom plate that intermesh with the protrusions on the top plate. In other preferred embodiments, a second attenuator clamp, having rounded protrusions, is clamped on the fiber on a second side of the fiber section to be handled to attenuate power of any light that may be transmitted through the fiber on that second side of the fiber section.

The optical attenuation scheme of the invention not only achieves fast, safe, and reliable attenuation of optical power transmitted in optical fibers, but does so with elegantly uncomplicated devices that significantly improve the attainable attenuation performance while at the same time reducing installation requirements and constraints. Such attenuation schemes find wide application to the field of optical fiber communication; as the number and types of fiber transmission networks increases, so too does the need for reliable and efficient optical power attenuation techniques. The invention provides attenuation techniques that are superior in their adaptability to the increasing needs of optical fiber communication systems. Other features and advantages of the invention will apparent from a description of a preferred embodiment, and from the claims.

DESCRIPTION OF A PREFERRED EMBODIMENT

Figure 1:
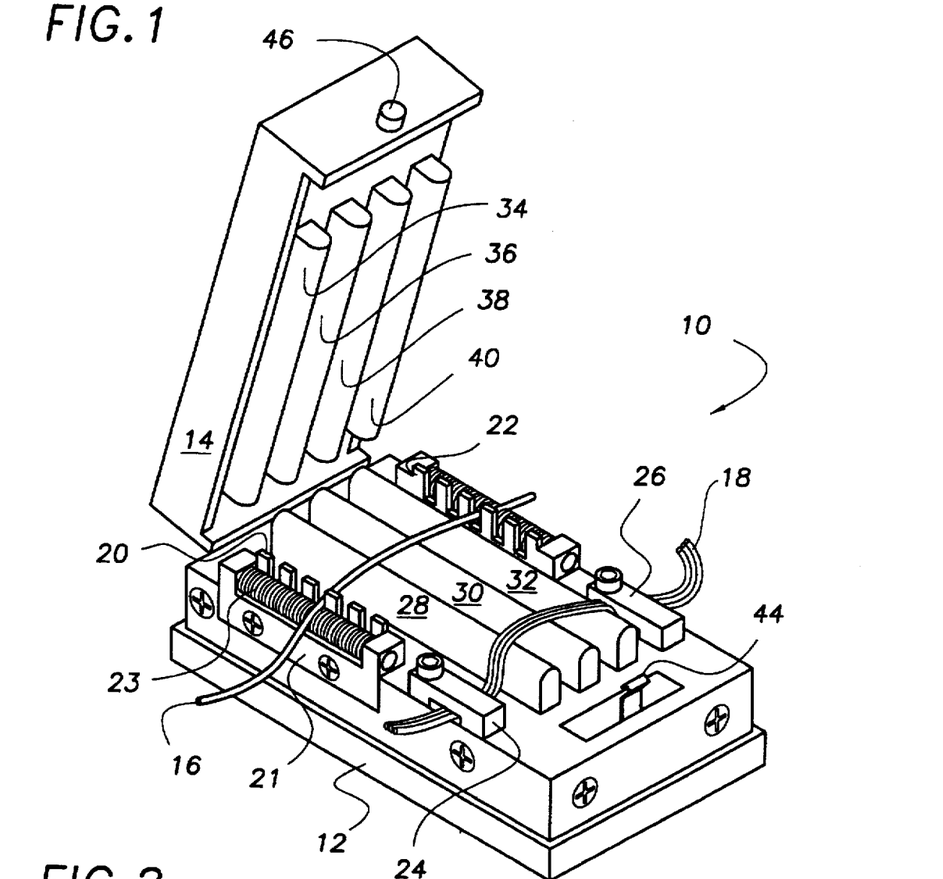
FIG. 1 is a schematic perspective view of an attenuator clamp for attenuating optical fiber signals in accordance with the invention.

Referring to FIG. 1, there is shown a first optical fiber attenuator in accordance with the invention. The optical fiber attenuator is embodied as an attenuator clamp 10 including a lower base plate 12 and an upper top plate 14. The top plate may be optionally connected at one end to the base plate 12 by, e.g., a hinge pin (not shown), or may be unconnected to the base plate. One or more individual single optical fibers 16 and a ribbon fiber 18, i.e., a cable in which several individual fibers are connected and encased in a side-by-side configuration, are simultaneously accommodated by the attenuator.

In operation of the attenuator clamp 10, individual fibers 16 are first loosely layed across the base plate 12 while the top plate 14 is raised. The individual fibers are held separated apart from each other by, e.g., a row of posts 20 on a side mounting plate 21 positioned on one lateral edge of the base plate, or by another such separator. A second row of posts 22 and mounting plate (not shown) can be located on the second lateral edge of the base plate. A ribbon fiber holder 24 on one lateral edge of the base plate 12 can also be included for securing a ribbon fiber at that edge. A second ribbon fiber holder 26 can optionally additionally be provided at the second lateral edge of the base plate for securing the ribbon of fiber at that edge.

Figure 2:
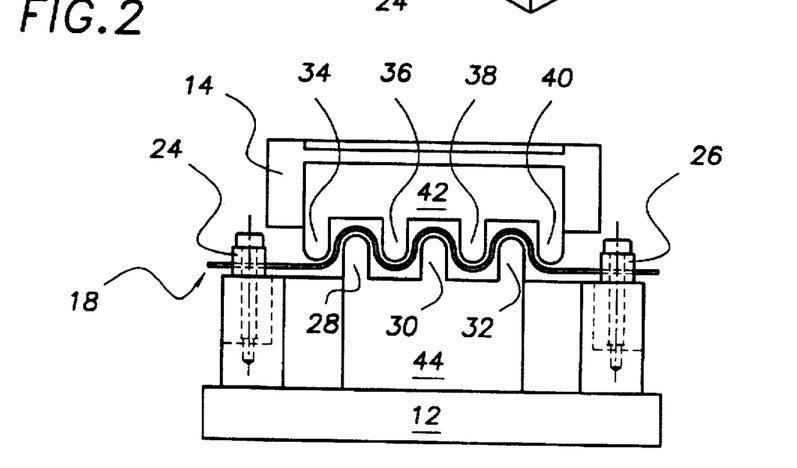
FIG. 2 is a side view of the attenuator clamp of FIG. 1.

Referring also to FIG. 2, attenuation of optical power is achieved by the attenuator clamp in the following manner. With one or more fibers and/or fiber ribbon cable loosely placed across the base plate 12, the top plate 14 is lowered to close the clamp by closing the top plate and base plate together. This closing action moves a series of vertical protrusions 34, 36, 38, 40, fixedly-located on the top plate into meshing alignment with a corresponding series of fixedly-located vertical protrusions 28, 30, 32 on the bottom plate. In other words, the protrusions on the top plate intermesh with the protrusions on the bottom plate. This intermeshing is enabled by a protrusion spacing whereby the upper protrusions are misaligned with the bottom protrusion to an extent that allows the protrusions to slide past each other as the top and bottom clamp plates are closed together.

As shown in the clamp side view of FIG. 2, once the clamp is closed, any individual optical fibers or fiber ribbon cable 18 in the clamp are forced to conform to the curved path defined by the intermeshing vertical protrusions of the top and bottom clamp plates. The fiber bending that results from the curved fiber path produces attenuation of signals in the fiber to a degree corresponding to the amount of bending.

Because the series of vertical protrusions on the top and base plates of the attenuator clamp are each fixed in position by support sections 42, 44, respectively, connected to the top and base plates, the protrusions never require manual alignment and correspondingly, the attenuator clamp never needs to be calibrated. With an optional hinge constituting the only possible moving mechanism of the attenuator clamp, the attenuator clamp can be installed extremely quickly and with a minimum of manual handling along a section of fiber for which attenuation is desired. No complex positioning of fiber is required; the fiber to be attenuated is simply placed across the base plate and the top plate is closed to affect signal attenuation. This ease of installation is superior to conventional optical attenuators because unlike conventional optical attenuators, the optical attenuator of the invention does not require input or output connectors for interfacing with a fiber.

In the case of manual handling of a section of optical fiber, and especially in the case of repair work on an active, broken optical fiber, this simple installation makes possible a fast and safe technique for attenuating possibly high-power optical signals before the length of fiber is handled or repaired. As a result, use of the attenuator clamp of the invention eliminates the need for shut-down of transmission equipment during fiber maintenance or repair work. Instead, upon reaching the location of a fiber break or a fiber section for which handling is required to, e.g., install a branch, provide maintenance, or otherwise handle the section, a repair person opens the attenuator clamp and then closes the clamp around an end of the fiber on one side of the break or section.

For a fiber section to be handled, this clamping reduces the power of light transmitted through the section. For a break in the fiber, this clamping reduces the power of light exiting the fiber at the break, thereby permitting safe manual handling of the fiber to repair the break. If the fiber to be repaired is transmitting two-way signals, i.e., if the fiber is duplexed or multiplexed, an attenuator clamp is optionally and typically preferably installed on each end of the fiber break. If laser light is only being transmitted from one end of the fiber, however, then an attenuator clamp need be installed only on the side of the break from which the signal is being transmitted.

After any manual handling or repair is completed on the fiber at the specified section or break, e.g., by splicing the break back together by fusion splicing, mechanical splicing, or other technique, the attenuator clamp or clamps can be removed from the fiber by opening the top plate to release the fiber from the clamp. The fiber then transmits optical signals at the original level prior to installation of the clamp. The inventors herein have experimented with the attenuator clamp on a range of individual optical fibers as well as fiber ribbon cables. It was found that use of the attenuator clamp does not adversely impact the quality of the fiber transmission after removal of the clamp. Fiber that was repeatedly bent in the attenuator clamp passed the 100 ksi proof test, a standard acceptance test for singlemode fiber, indicating that the mechanical integrity of the fiber was not degraded by the attenuation clamp mechanism.

Figure 3:
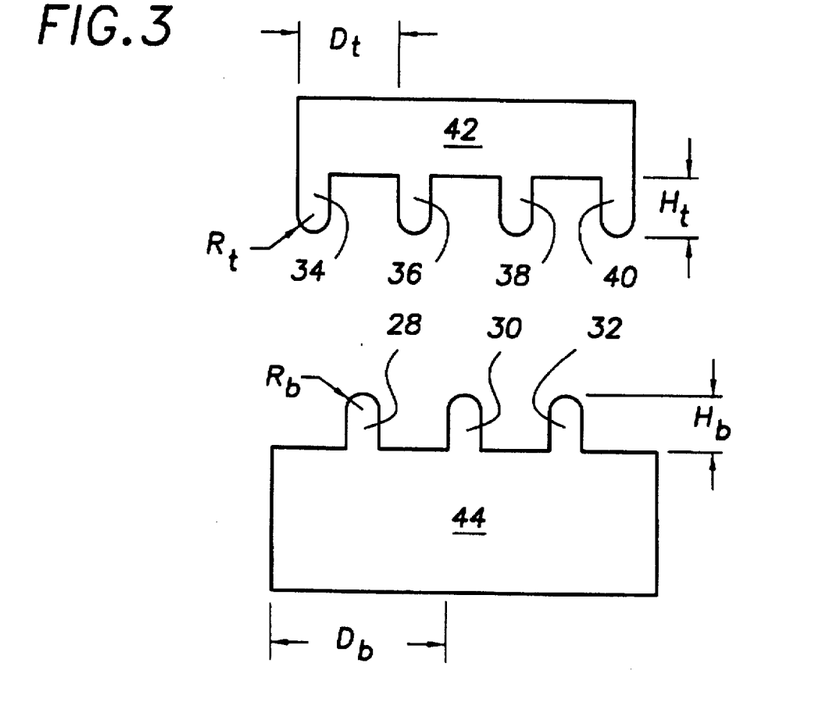
FIG. 3 is a side view of fiber-bending protrusions provided by the attenuator clamp of FIG. 1.

Considering now the specific geometry of the attenuator clamp protrusions, as shown in FIG. 3, the bottom plate's series of protrusions 28, 30, 32 is designed to intermesh with the top plate's series of protrusions 34, 36, 38, 40, as explained above. The protrusions in each series are each preferably of a relatively large radius such that stress and strain imposed on the fiber is minimized as the fiber bends around the intermeshed protrusions. Accordingly, a plurality of large-radius protrusions is preferable over a single small-radius protrusion for many applications. Additionally, it is preferable that the protrusions be formed of a smooth material, e.g., an engineering resin such as Delrin™, that does not have sharp surface asperities, which could damage an optical fiber.

While FIG. 3 illustrates an example clamp design in which three base plate protrusions are employed and four top plate protrusions are employed, this specific combination is not required. As will be understood by those skilled in the art, for a given protrusion radius, one can determine a necessary number of protrusions for achieving a desired degree of attenuation, as explained in detail below. In addition, a desired degree of bending can be attained by a combination of protrusions on either the top plate or base plate alone, in combination with a flat surface provided on the other plate. Furthermore, neither the top plate protrusions nor the base plate protrusions need span the entire length of the top plate and base plate, respectively. All that is required is that the protrusions extend laterally for a distance sufficient to support one or more optical fibers for which attenuation is desired. Thus, e.g., the protrusions can optionally span only a subsection of the base plate and top plate length.

Indeed, the positioning, number, and size of the protrusions can be customized for a given attenuation application. For example, in the case of repair work on an active fiber, it is often preferable to attenuate a high-power optical signal as much as possible. The inventors herein have experimented with the attenuator clamp for this application; here the height, $H_t$, of the top plate protrusions was set at about 0.188 inches and the height, $H_b$, of the base plate protrusions was also set at about 0.188 inches. The radius of the top plate protrusions, $R_t$, was set at about 0.0625 inches and the radius of the base plate protrusions, $R_b$, was set at about 0.063 inches. The distance from one top plate protrusion edge to the corresponding edge of the adjacent top plate protrusion, $D_t$, was set at about 0.363 inches, and the distance from one base plate protrusion edge to the corresponding edge of the adjacent base plate protrusion, $D_b$, was set at about 0.362 inches. This protrusion geometry and spacing was found to provide adequate room for an optical fiber to wind its way between the top plate and base plate protrusions when they intermeshed as the attenuator clamp was closed.

With this geometric configuration, the inventors measured the degree of attenuation produced when the attenuator clamp was installed around a fiber through which laser light was transmitted at a wavelength of about 1310 nm. It was found that the power of the 1310 nm laser light was attenuated by up to a factor of about 50 dB; i.e., up to about −50 dB of attenuation of the 1310 nm light was achieved. This corresponds to an attenuation factor of about 100,000. In other words, laser light of about 2 mW in power is attenuated by the attenuator clamp to a power level of about 0.000020 mW with the geometric specifications given above. This sharp reduction in laser light power provides a safe power level at which the fiber length transmitting the light can be manually handled.

As will be recognized by those skilled in the art, other protrusion geometries can be accommodated by the attenuator clamp of the invention for achieving other levels of optical power attenuation. In other applications, e.g. in the case of a desire for a modest degree of attenuation along an unbroken length of optical fiber, the number and size of protrusions can be designed to provide the desired attenuation. The physical bending phenomena on which the attenuation mechanism is based allows for this customization.

Figures 4A, 4B, 4C, 4D:
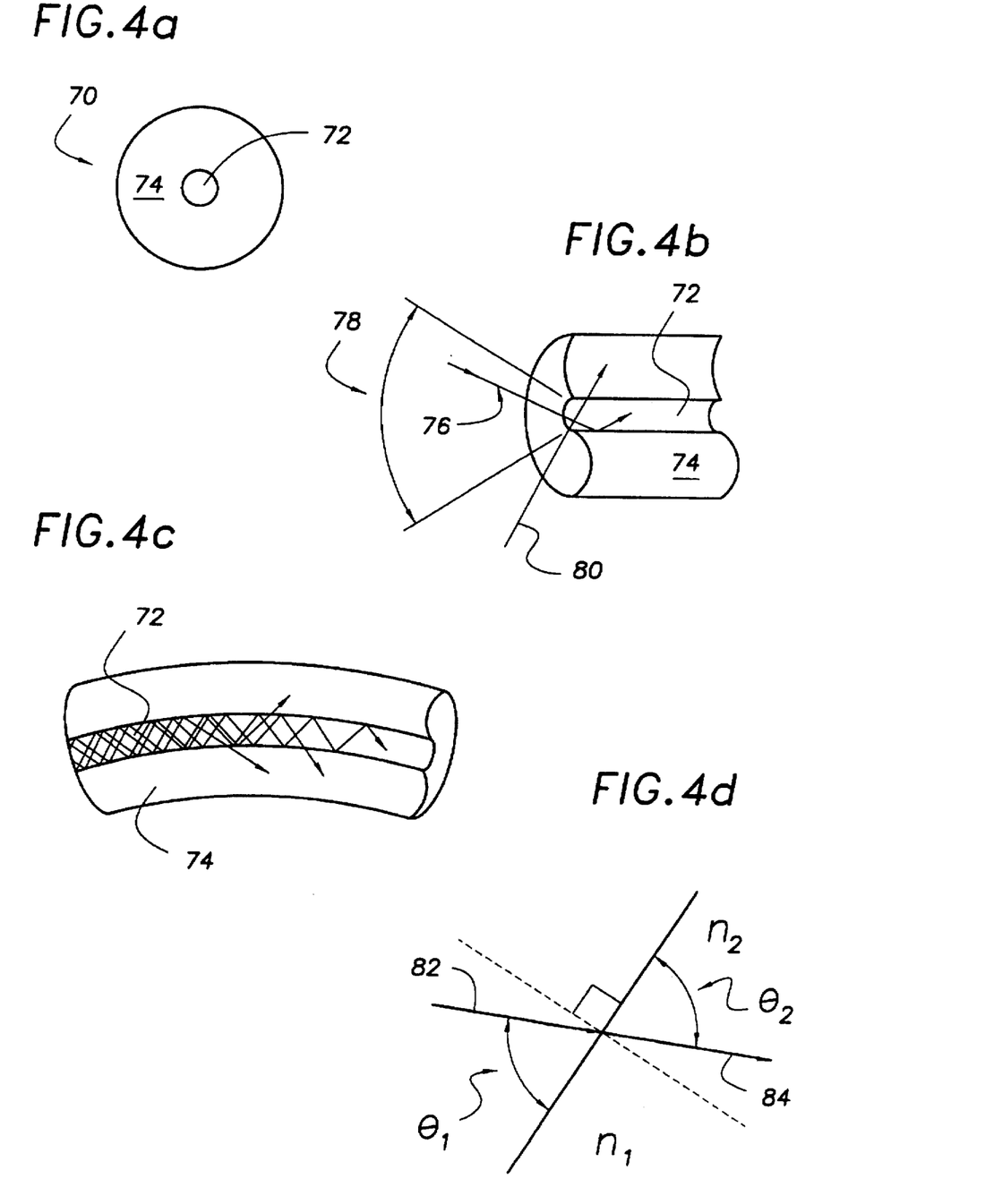
FIGS. 4A–4C are schematic views of an example optical fiber that can be manipulated in accordance with the invention.
FIG. 4D is a schematic illustration of the geometric relationship of Snell's law.

Referring to FIGS. 4A–4C, the attenuation mechanism is based on loss of laser light out of the fiber core and absorption of that light into the fiber cladding at the location of a bend in the fiber, as explained above. Specifically, as shown in the figures, an optical fiber 70 conventionally includes a core section 72 surrounded by a cladding section 74, both of silica. Typically, the core silica is processed such that the index of refraction of the core 72 is larger than the index of refraction of the fiber cladding 74. Laser light injected into the fiber core 72 at an angle relative to the axial center of the core interacts with the core/cladding interface based on the degree of the injection angle.

This interaction is based on Snell's law, illustrated in FIG. 4D, which states that $$n_1 \sin(\theta_1) = n_2 \sin(\theta_2), \quad (1)$$

where $n_1$ and $n_2$ are the indices of refraction of a first medium and a second medium, respectively, and $\theta_1$ and $\theta_2$ are the angles, relative to the perpendicular, of a light ray in the first and second mediums, respectively, as the light ray approaches 82 and exits 84 an interface between the two media. With this relationship, it is seen that if $\theta_2$ is specified to be an angle greater than 90°, then the light ray approaching the interface between the two media will be reflected back into the first medium; i.e., the light ray will undergo total internal refection in the first medium. Specifying the first medium as the core of an optical fiber and the second medium as the cladding of an optical fiber, and setting $\theta_2$ at 90°, the relationship governing the minimum condition for achieving total internal reflection of light in the fiber core is given as:

$$\sin(\theta_{cr}) = n_{cl}/n_c, \quad (2)$$

where $\theta_{cr}$ is the critical angle of a light ray in the core approaching the cladding, and $n_c$ and $n_{cl}$ are the indices of refraction of the core and cladding, respectively.

For given indices of refraction of the fiber core and cladding, any light ray in the core that meets the core-cladding interface at an angle greater than $\theta_{cr}$ will be reflected back into the core; any light ray in the core that meets the core-cladding interface at an angle less than $\theta_{cr}$ will escape out of the core into the cladding. Once in the cladding, escaped light is quickly absorbed and reduces the power of the signal remaining to propagate down and be transmitted through the fiber core, as shown in FIG. 4C. While this condition is in practice a complicated function of other geometric and materials aspects of the optical fiber, this relationship is the basis of the absorption phenomena. Light rays that meet the total internal condition requirement for reflectivity within the fiber core "bounce" down the core and can propagate along the fiber with very little power loss.

Thus, either by producing a very small-radius bend in a fiber (to produce a core-cladding angle much less than the critical angle), or by producing a plurality of such bends, an optical fiber is manipulated in accordance with the invention to achieve a desired attenuation of light in the fiber by way of power absorption in the cladding of the fiber. The sharper the bend in the fiber, or the greater the number of bends in the fiber, the larger the degree of optical fiber power that escapes out of the core and is attenuated by absorption in the cladding.

Referring now back to FIG. 1, the attenuator clamp 10 of the invention preferably provides features for ensuring safe installation and operation of the attenuator. For example, at an end of the base plate there can be provided a closure mechanism, e.g., a hasp 44, that is spring-loaded to automatically engage a hasp pin 46 in the top plate when the top plate is lowered to close the clamp. When closed, the top plate is held firmly against the base plate by the positive force of the hasp closure. The hasp must be manually actuated before the top plate can be opened. This positive engaging action and manual opening mechanism ensures that the attenuator clamp is securely closed and that it remains closed while in use; any unintentional opening of the clamp while a high-power optical fiber is manually handled could result in unwanted safety risks. As will be recognized by those skilled in the art, alternate securing devices can also be employed to securely hold the top and base plates closed. For example, a snap lock, clip, or other securing device can be used. If a hinge is not employed to rotatably connect one edge of the top plate to one edge of the base plate, it may be preferable in some cases to provide a securing device at more than one side of the clamp to ensure that the top and base plates are indeed securely closed during operation.

Figure 5:
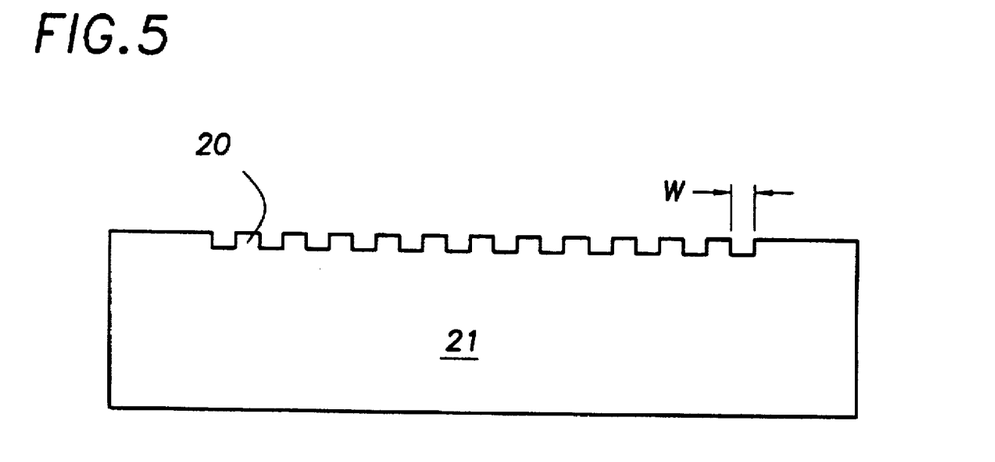
FIG. 5 is a side view of a fiber strand separator provided by the attenuator clamp of FIG. 1.

Referring also to FIG. 5, as described above, the attenuator clamp preferably includes one or more rows of posts 20, 22, for holding individual fibers separated as the fibers are positioned in the clamp. A mounting plate 21 including, e.g., a row of twelve posts 20 can accommodate twelve individual fiber strands held separated. The length of the base plate 12 and top plate 14 can be adjusted to support a mounting plate 21 having any desired number of separator posts. The width W of each recess between two adjacent mounting plate posts 20 is preferably selected to correspond to at least the largest individual fiber strand diameter expected to be used, including the thickness of the fiber jacket, if one is included in the fiber for which signal attenuation is desired. Optionally, a coil spring 23 is provided for added support of single fibers held between the mounting plate posts 20; individual fibers are positioned between turns of the spring. Using the spring, several individual fibers can be held separated apart by turns of the spring but together positioned in the same recess between two adjacent posts on the mounting plate 21. In addition, a plurality of fiber ribbon cable holders or holder pairs, 24, 26, can optionally be included such that the attenuator clamp can accommodate a plurality of ribbon cables. As in the case of the strand separator posts 20, the lengths of the base plate and top plate can be adjusted to accordingly accommodate a desired number of ribbon cable holders or holder pairs.

Any of the individual fiber strands to be attenuated by the attenuator clamp can be a section of fiber connected at one or both ends to transmission and/or reception equipment in, for example, a signal transmission network. In other words, any of the fibers may be unbroken and actively or inactively connected to transmit signals, and at the same time, any of the fibers may be broken or intentionally cut and actively or inactively connected to transmission equipment at one or both ends. Likewise, a ribbon cable of fibers to be attenuated by the attenuator clamp can be connected at both ends as part of a transmission system or may be connected at only one end, in the case of, e.g., a broken or cut cable.

Figure 6A:
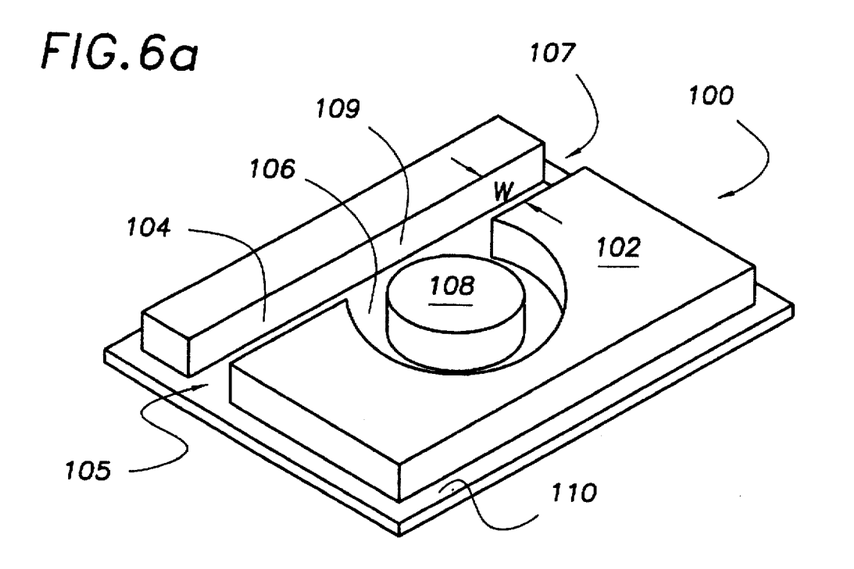
FIG. 6A is a schematic perspective view of a first channel attenuator for attenuating optical fiber signals in accordance with the invention.

Turning now to FIG. 6A, there is shown an additional optical fiber attenuator in accordance with the invention. Here the attenuator is embodied as a channel attenuator 100 including a rigid channel plate 102 having a channel 104 in which an optical fiber can be placed. The channel 104 preferably includes a nonlinear geometric channel path along a portion of the channel, e.g., a circular channel section 106, in which the fiber is placed such that bends in the nonlinear channel path produce corresponding bends in the length of optical fiber. As explained above, such bends in the fiber result in escape of light from the fiber core into the fiber cladding, whereby the optical power in the fiber core is attenuated to a degree corresponding to the degree of fiber bend.

The nonlinear channel path 106 is defined by the geometry of the channel plate 102. For example, in the case of a circular channel path, a circular protrusion 108 defines the nonlinear channel path. The nonlinear channel path is directly joined with the channel 104 at a joining section 109 such that a fiber can be placed in an unbroken channel. For example, as shown in the figure, an unbroken channel is provided from a first input point 105 to the nonlinear path joining section 109, around the circular section 106, back to the nonlinear path joining section 109, and out to an output point 107. No optical connectors are required to position an optical fiber in the channel attenuator.

Figure 6B:
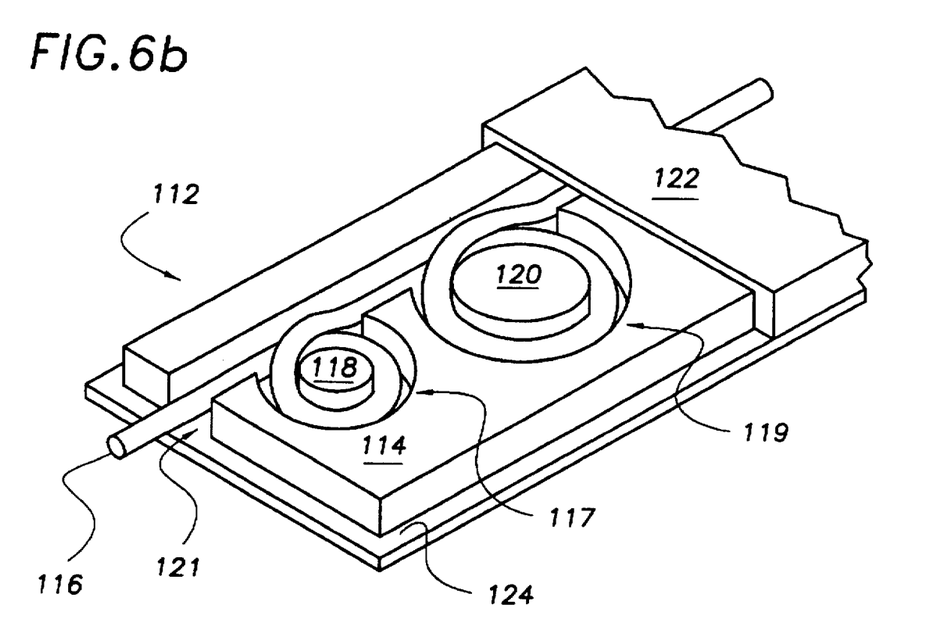
FIG. 6B is a schematic perspective view of a second channel attenuator for attenuating optical fiber signals in accordance with the invention.

Referring also to FIG. 6B, a channel attenuator in accordance with the invention is not limited to a particular nonlinear channel path geometry, but instead can take on any suitable nonlinear geometry for providing a desired degree of optical attenuation. For example, in a second channel attenuator 112 in accordance with the invention, the channel base plate 114 provides a plurality of nonlinear channel path sections 117, 119, which each connect to a channel having an input point 121 and output point (not shown) on the channel base plate. Here the two circular channel paths are defined by protrusions 118, 120, in the channel base plate. An optical fiber 116 is placed in the channel such that it follows an unbroken channel path from an input point 121, around each of the circular channels 117, 119, and then out of the channel base plate at an output point (not shown). Once a fiber has been positioned in the channel, a slidable cover 122 can be positioned over the channel to ensure that the fiber remains in the channel. The cover 122 is supported by a base plate 124 (or 110 in FIG. 6A) that extends beyond the periphery of the channel plate 114 (102 in FIG. 6A). Optionally, a self-adhesive material, e.g., a label or piece of tape, can be wrapped around the channel attenuator once the channel plate is covered by the cover to ensure that the cover is not inadvertently removed while the attenuator is installed.

The channel attenuator of the invention provides the ability to very quickly attenuate optical power in an active optical fiber. In the case of an unbroken length of fiber for which attenuation is desired, the fiber can be positioned in the attenuator channel without shutting down the laser source transmitter; i.e., the channel attenuator can be installed while the fiber is active. In the case of broken or intentionally-cut fiber that is actively transmitting optical signals, a channel attenuator can be installed on one or both sides of the fiber break; here it is preferable that either the laser source be shut down during installation, or that another attenuation device, e.g., the attenuator clamp provided by the invention, be clamped at the ends of the break. Installation does not require any alignment or calibration of attenuator components, as is the case with typical attenuators, and thus can be accomplished in a matter of seconds. Fiber to be positioned in the attenuator channel does not need to be interfaced to input or output connectors, and thus very little manipulation of a fiber is required during installation.

Considering now specific features of the channel attenuator, the degree of attenuation provided by the attenuator is determined by the nonlinear channel path of the attenuator. Any straight channel sections, e.g., the straight section 104 shown in FIG. 6A, do not bend a fiber positioned in the channel and therefore do not produce any significant attenuation of light carried by the fiber. Each of the one or more nonlinear path sections of channel produce attenuation of light carried by the fiber to a degree dependent on the bending of the path. Both straight and nonlinear sections of the channel are preferably of a width sufficient to accommodate an optical fiber for which attenuation is desired. For example, in the case of accommodation of a three-millimeter jacketed optical fiber, the width W(FIG. 6) of the channel is preferably at least about 0.109 inches. As will be understood by those skilled in the art, the width of the channel is thus specifically selected for the fiber width to be accommodated in a given application. While the channel width can be larger than the diameter of the fiber which it is to accept, the width is preferable not so large that the fiber easily fails out of the channel. If this is the case, however, the attenuator cover 122 will ensure that the fiber remains in the attenuator channel path.

Figure 7A:
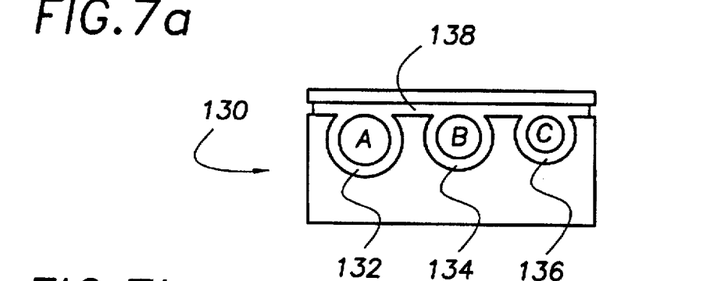
FIGS. 7A–7C are schematic top views of three channel attenuators each for attenuating optical fiber signals in accordance with the invention.
Figure 7B:
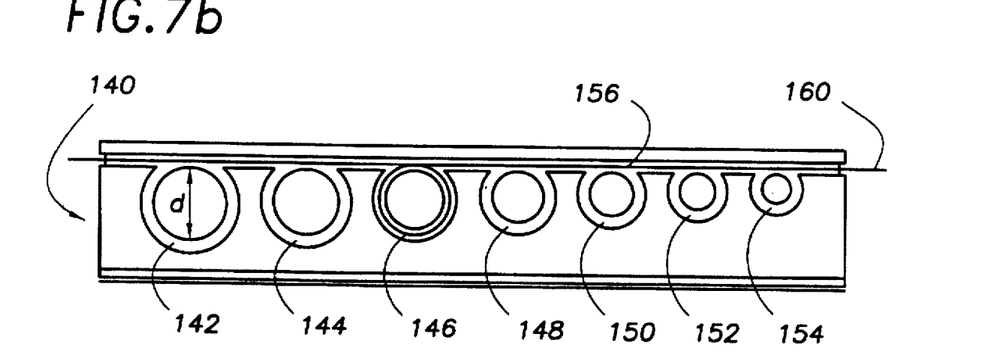

As shown in the attenuator of FIG. 6B, each nonlinear path section of the attenuator channel can be of a different geometry. For example, a first circular path 117 can be of a path radius that is less than that of a second circular path 119. Referring also to FIGS. 7A-7B, the channel attenuator of the invention can take the form of an adjustable channel attenuator 130, 140, in which a plurality of nonlinear channel sections are included to provide a range of attenuation levels. For example, three circular path sections 132, 134, 136, can be included, the first two sections 132, 134, having the same radius and the third section 136 having a larger radius. As explained above, the smaller the radius of a bend imposed upon on optical fiber, the more that bend attenuates optical power in a fiber. Accordingly, the larger-radius circular path section 136 produces less optical attenuation than each of the smaller-radius circular path sections 132, 134.

An optical fiber can be placed in the straight channel section 138 of the attenuator 130 and wound through one, two or all three of the nonlinear channel sections; each possible channel path provides a different degree of attenuation. For example, in the case of an attenuator including three different nonlinear path sections, seven different attenuation levels are provided. Referring to the alphabetical identification of each of the three nonlinear channel paths, the seven possible channel paths include A, B, C, A-B, A-C, B-C, and A-B-C. Thus, a wide range of attenuation levels is provided by the channel attenuator of the invention without the need for a single moving mechanical component for adjusting the attenuation level. Simple manual manipulation of a fiber along portions of the channel path is all that is required to adjust the attenuation level. As shown in FIG. 7B, any number of nonlinear paths 142, 144, 146, 148, 150, 152, 154, can be provided to produce a desired range of attenuation levels. All that is required is that all of the nonlinear paths be connected to a common section 156 of the channel for positioning a fiber in the channel plate of the attenuator. An optical fiber 160 can then be positioned in any one or all of the nonlinear channel sections of the channel plate. For example, as shown, the fiber can be positioned in only one 146 of the nonlinear path sections to implement the attenuation produced only by that section. Similarly for the channel attenuator of FIG. 6B, a fiber 116 can be positioned in one 117 or the other 119 of the nonlinear channel paths, rather than in both channel paths as is shown.

Because the channel attenuator includes no moving components, the attenuation it provides is guaranteed to be reproducible. Furthermore, the channel attenuator has no inaccessible ferrule faces that could accumulate dirt and possibly alter the bending profile of a path along the attenuator channel. Preferably, the channel attenuator is formed of a durable engineering resin, e.g., Delrin™, that is impervious to outdoor environments. The channel attenuator, like the clamp attenuator described above, provides truly passive attenuation of optical power, i.e., the attenuator does not actively process an optical signal in order to attenuate the signal, and thus there is no back reflection in the optical transmission system as a result of the attenuator while it is installed on an active fiber.

Figure 8:
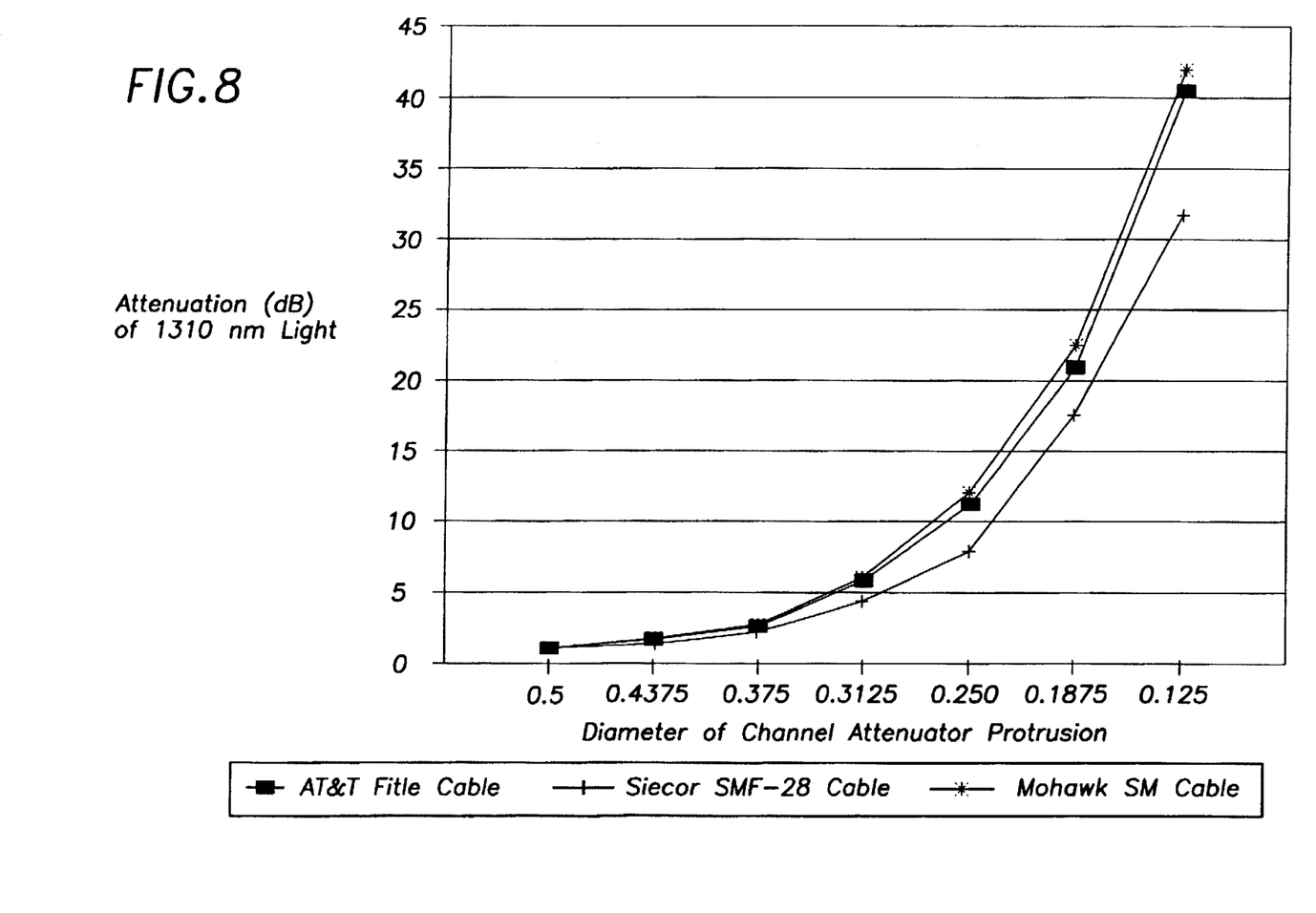
FIG. 8 is a plot of attenuation in decibels produced by the channel attenuator of FIG. 7B for 1310 nm light.

Referring to FIG. 8, there are shown the results of an experiment to determine the range of optical attenuation levels provided by the channel attenuator of FIG. 7B. Three different optical fibers were tested, including ATT Fitel-type UL Type OFNR fiber, Siecor Optical Cable SMF-28 UL Type OFNR, and Mohawk SM 8/125 µm E132795 UL Type OFNR fiber. The channel attenuator was provided with seven different nonlinear channel sections, each having a bending radius defined by the diameter, d, of the center protrusion in each radial path. As shown in the figure, the protrusion diameters ranged from a smallest diameter of 0.125 inches to a largest diameter of 0.5 inches.

To test the attenuation of the channel attenuator, each of the three types of optical fiber was separately installed in the channel attenuator and for each, the amount of attenuation of 1310 nm optical power transmitted through the fiber and produced by an EXFO FLS210A-23BL-UI light source was measured using an EXFO FOT-22A power meter at the output of the attenuator. Each of the three types of fiber was tested seven times, once for each of the seven possible configurations in which the fiber follows only one of the radial paths in the channel. This allowed for measurement of the attenuation produced individually by each of the nonlinear paths.

As shown in FIG. 8, the smaller-diameter circular paths produced greater attenuation than the larger-diameter circular paths. The largest attenuation, produced by the 0.125-inch circular path, ranged between 31 dB (for the Siecor fiber) and 41.3 dB (for the Mohawk fiber). The smallest attenuation, produced by the 0.5-inch circular path, ranged between 0.41 dB (for the Siecor fiber) and 0.59 dB (for the Mohawk fiber). For all three types of fiber, it was found that once the fiber was removed from the channel attenuator, the power of the 1310 nm light transmitted by the fiber returned to its original power level. It was also found that the attenuation level produced by the channel attenuator was reproducible over time; i.e., repeated installation of a given fiber in the attenuator resulted in an expected, reproducible level of attenuation.

As is seen by the testing results, a channel attenuator including only seven nonlinear path sections provides a wide range of attenuation levels. A large number of distinct attenuation values along this range can be attained by positioning a fiber in a combination of two or more of the nonlinear sections to achieve a composite attenuation level based on the attenuation provided by each of the sections. The channel attenuator can thus be employed as a fixed-value attenuator for a given application or a variable attenuator for a range of applications.

Figure 7C:
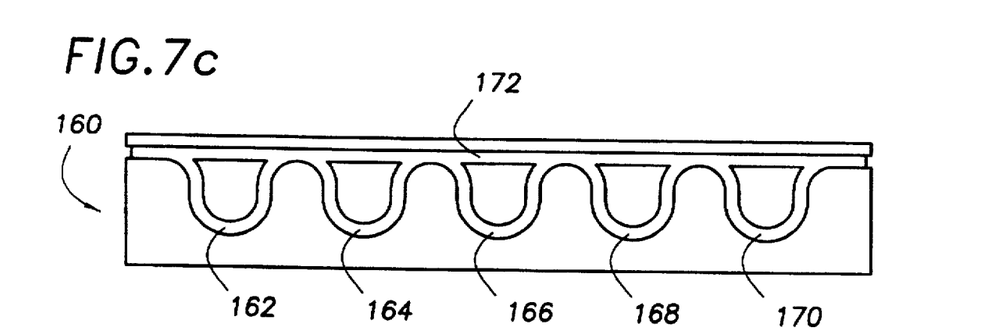

As will be recognized by those skilled in the art, the nonlinear sections of the channel attenuator can be selected as any desired nonlinear geometry. For example, as shown in FIG. 7C, a channel attenuator 160 can be provided with a plurality of nonlinear arcing paths 162, 164, 166, 168, 170, that each are connected to a common straight channel section 172. While the arcing paths can all be of the same arc radius, each arcing path alternatively can be of a different arc radius. An optical fiber can be positioned in one or more of the arcing paths along the straight channel section to affect a desired level of optical power attenuation. Similarly, a nonlinear path that resembles a sinusoidal shape or other similar winding geometry can be employed as the nonlinear path geometry.

Figure 9:
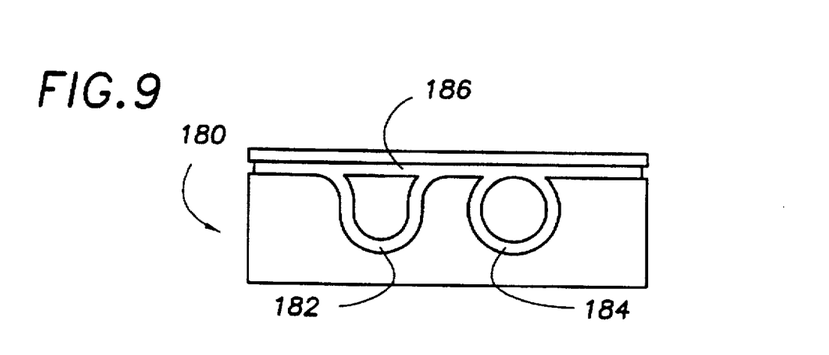
FIG. 9 is a schematic top view of a fourth channel attenuator for attenuating optical fiber signals in accordance with the invention.

In addition, as shown in FIG. 9, a channel attenuator 180 can be provided with a plurality of nonlinear sections 182, 184, connected to a common straight channel section 186, the nonlinear sections being of differing geometries. This configuration provides the ability to precisely tailor the particular attenuation values and range of values produced by the attenuator. Any of a wide range of nonlinear path geometries is suitable for the channel attenuator, and may include a channel path whereby the channel plate edge at which the fiber is input is the same channel plate edge at which the fiber is output.

Based on the discussion above of the optical absorption phenomenon invoked by the attenuators of the invention, one can tailor a nonlinear channel geometry to produce a desired level of attenuation with a corresponding channel bending radius. The geometry of the nonlinear channel path can take of the form of a sinusoid, an ellipse, a curvy, "S"-shaped path, or any nonlinear trajectory that includes a bend along the trajectory.

From the foregoing, it is apparent that the optical attenuators described above not only achieve fast, safe, and reliable attenuation of optical power transmitted in optical fibers, but do so with elegantly uncomplicated devices that significantly improve the attainable attenuation performance while at the same time reducing installation requirements and constraints. It is recognized, of course, that those skilled in the art may make various modifications and additions to the preferred embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. An attenuator for attenuating light transmitted through at least one optical fiber, comprising:

a base plate having a series of vertical protrusions extending therefrom: and a top plate positioned to close with the base plate to clamp a length of the at least one optical fiber between the base plate vertical protrusions and the top plate such that the length of the at least one optical fiber bends around the protrusions, a fiber separator being provided at an edge of the base plate for maintaining separation between optical fibers as they are bent around the protrusions.

2. The attenuator of claim 1 wherein the top plate has a series of vertical protrusions located in a position to intermesh with the vertical protrusions of the base plate.

3. The attenuator of claim 2 wherein the base plate further comprises a fiber holder positioned at one edge of the base plate to secure an optical fiber at that edge.

4. An attenuator for attenuating light transmitted through an optical fiber, comprising:

a base plate having a series of vertical protrusions extending therefrom and comprising a first fiber holder located at one edge of the base plate to secure at least one optical fiber at that one edge and a second fiber holder located at a second edge of the base plate to secure at least one optical fiber at that second edge; and a top plate having a series of vertical protrusions extending therefrom and located in a position to intermesh with the vertical protrusions of the base plate, the top plate positioned to close with the base plate to clamp a length of at least one optical fiber between the base plate and the top plate vertical protrusions such that the at least one optical fiber bends around the protrusions.

5. The attenuator of claim 2 further comprising a hinge attached to one end of the base plate and a corresponding end of the top plate to rotatably connect the base plate to the top plate.

6. The attenuator of claim 2 wherein the vertical protrusions of the base plate and the vertical protrusions of the top plate comprise rounded protrusions.

7. The attenuator of claim 1 wherein the fiber separator comprises a row of separator posts between adjacent of which an optical fiber can be positioned.

8. The attenuator of claim 1 wherein the fiber length separator comprises a spring having a plurality of spring turns between adjacent of which an optical fiber can be positioned.

9. An attenuator for attenuating light transmitted through an optical fiber, comprising:

a base plate having a series of vertical protrusions extending therefrom and comprising a first fiber ribbon cable holder located at one edge of the base plate to secure at least one optical fiber ribbon cable at that one edge and a second fiber ribbon cable holder located at a second edge of the base plate to secure at least one optical fiber ribbon cable at that second edge; and a top plate having a series of vertical protrusions extending therefrom and located in a position to intermesh with the vertical protrusions of the base plate, the top plate positioned to close with the base plate to clamp a length of at least one optical fiber ribbon cable between the base plate and the top plate vertical protrusions such that the at least one optical fiber ribbon cable bends around the protrusions.

10. An attenuator comprising:
a base plate having a series of vertical protrusions extending therefrom and having a closure securing device located on the base plate; and
a top plate having a series of vertical protrusions extending therefrom and located in a position to intermesh with the vertical protrusions of the base plate, and having a corresponding closure securing device located on the top plate in a position to engage the securing device on the base plate when the top plate is lowered to close with the base plate, the top plate positioned to close with the base plate to clamp a length of at least one optical fiber between the base plate and the top plate vertical protrusions such that the at least one optical fiber bends around the protrusions.

11. An attenuator for attenuating light transmitted through an optical fiber comprising:
a rigid base plate having a channeled depression, on one face of the base plate, that extends from a first point at an edge of the base plate face to a second point at an edge of the base plate face to form a continuous channel path, between the first and second edge points, in which a length of optical fiber can be positioned, the channel path forming a path around a plurality of circles, each of the plurality of circles being of a distinct circle radius, with the channel path extending from the circle of largest radius, located nearest to the first edge point of the base plate, to the circle of smallest radius, located nearest to the second edge point of the base plate, with circles of intermediate radii located between the first and second edge points, from largest to smallest radius, respectively, bends in the circular channel path producing corresponding bends in the length of optical fiber.

12. The attenuator of claim 11 wherein the channeled depression is of a depth sufficient to support an optical fiber such that the optical fiber does not protrude from the face of the base plate.

13. The attenuator of claim 11 wherein the channeled depression further comprises a straight channel path connected to the circular channel path between the first and second base plate edge points.

14. The attenuator of claim 11 wherein the channel path further forms a sinusoidal path.

15. The attenuator of claim 11 wherein the channel path further forms an elliptical path.

16. A method for safely repairing a break in an optical fiber at the same time that light may be transmitted through the fiber, comprising the steps of:
at a point along the fiber on one side of the break, clamping the fiber between top and bottom plates of an attenuator clamp, having protrusions, that bends the fiber around the protrusions to attenuate power of any light that may be transmitted through the fiber on that one side of the break;
clamping a second attenuator clamp, having top and bottom plates and having protrusions, on the fiber on a second side of the break to attenuate power of any light that may be transmitted through the fiber on that second side of the break; and
after the fiber is clamped, repairing the break in the fiber.

17. The method of claim 16 further comprising the step, after the break in the fiber is repaired, of removing the attenuator clamp.

18. The method of claim 16 wherein the attenuator clamp has protrusions on the top plate and protrusions on the bottom plate that intermesh with the protrusions on the top plate.

19. A method for attenuating light transmitted through a length of optical fiber, comprising the steps of:
securing a first point along the optical fiber in a first fiber holder at a first edge of a bottom plate of an attenuator clamp;
securing a second point along the optical fiber in a second fiber holder at a second edge of a bottom plate of the attenuator clamp; and
clamping the fiber at a point along its length between the first and second secured points between top and bottom plates of the attenuator clamp, having rounded protrusions in the clamp, to bend the fiber around the protrusions in the clamp.

20. A method for attenuating light transmitted through a length of optical fiber, comprising the step of positioning a section of the fiber length in a channeled depression of a channel attenuator base plate having a continuous channel path between a first edge point of the base plate and a second edge point of the base plate, the channel path forming a path around a plurality of circles, each of the plurality of circles being of a distinct circle radius, with the channel path extending from the circle of largest radius, located nearest to the first edge point of the base plate, to the circle of smallest radius, located nearest to the second edge point of the base plate, with circles of intermediate radii located between the first and second edge points, from largest to smallest radius, respectively, to bend the fiber section along the circular channel path.

21. The method of claim 20 wherein the channel path further forms a sinusoidal path.

22. The method of claim 20 wherein the channel path further forms an elliptical path.

23. A method for safely handling an optical fiber at the same time that light may be actively transmitted through the fiber, comprising the steps of:
at a point along the fiber on one side of a fiber section to be handled, clamping the fiber between top and bottom plates of an attenuator clamp, having protrusions, that bends the fiber around the protrusions to attenuate power of any light that may be transmitted through the fiber on that one side of the section to be handled;
clamping a second attenuator clamp, having top and bottom plates and having protrusions, on the fiber on a second side of the fiber section to be handled, to attenuate power of any light that may be transmitted through the fiber on that second side of the fiber section; and
after the fiber is clamped, handling the section of fiber.

24. The method of claim 23 further comprising the step, after the section of fiber is handled, of removing the attenuator clamp.

25. The method of claim 23 wherein the attenuator clamp has protrusions on the top plate and protrusions on the bottom plate that intermesh with the protrusions on the top plate.

* * * * *